July 25, 1944.   H. D. STEVENS   2,354,434
TIRE BUILDING APPARATUS
Filed Aug. 6, 1941   4 Sheets-Sheet 1

Inventor
HORACE D. STEVENS
By Ely & Frye
Attorneys

July 25, 1944.  H. D. STEVENS  2,354,434
TIRE BUILDING APPARATUS
Filed Aug. 6, 1941  4 Sheets-Sheet 2

Inventor
HORACE D. STEVENS

Patented July 25, 1944

2,354,434

UNITED STATES PATENT OFFICE 2,354,434

TIRE BUILDING APPARATUS

Horace D. Stevens, Akron, Ohio, assignor to The Firestone Tire & Rubber Company, Akron, Ohio, a corporation of Ohio Application August 6, 1941, Serial No. 405,665

12 Claims. (Cl. 154—10)

This invention relates to tire building apparatus and more especially it relates to stitching mechanism for operating upon the fabric plies of a tire casing after said plies have been applied to a rotatable tire-building form or drum.

The apparatus is designed especially for operative association with tire building drums for the manufacture of large, heavy-duty pneumatic tire casings such as are composed of ten or twelve plies of fabric, and which include at least two bead cores in each marginal bead. In the manufacture of a tire of the character mentioned by the drum-built method, the bead portions of the tire require to be constructed in substantially the same positions they occupy in the completed tire since heavy double-core beads may not be twisted or deformed during the shaping of the drum-built tire band to conventional tire shape. Accordingly the tire building drums are formed with obliquely undercut side faces upon which the bead portions of the tire are built. Tire building fabric is applied to the drum in strips that are transversely flat and extend well beyond the lateral margins of the drum so as to be capable of being folded radially inwardly about said margins of the drum and thus to be laid upon the undercut sides thereof, either under or over the bead cores thereon as the case may be. Usually such folding of the fabric plies is effected concurrently upon two or four fabric plies. The tire building apparatus constituting the subject matter of this invention is employed for working the marginal portions of the fabric plies about the bead cores of a tire being constructed on a drum.

Different fabric plies of a tire are anchored to the bead cores of a tire in a different manner. For example, some plies are turned up around a bead, whereas other plies may be folded under the beads. In such cases the stitching tools that operate upon the fabric may move inwardly over the fabric in the direction of the axis of the tire, or they may move radially outwardly of the tire toward the periphery thereof. Accordingly, one of the chief objects of the invention is to provide fabric-stitching mechanism of the character mentioned that is power operated to move in either direction radially of the tire building drum at relatively slow speed.

The stitching tools also are required to apply some of the fabric plies to the inner circumference of the bead portions of the tire. This operation requires to be effected slowly so that the wrinkles may be worked out of the fabric. The stitching tools are urged toward the work by fluid pressure operated means, with the result that difficulty has been encountered heretofore in moving the tools slowly when the fabric is being laid parallel to the direction of movement of the tools. Accordingly another object of the invention is to provide fluid pressure means for operating the stitching tools, including means for stopping the feed of the tool in determinate position for an interval of time, and then permitting the tool to resume its feeding movement. Other objects will be manifest as the description proceeds.

Figure 1:
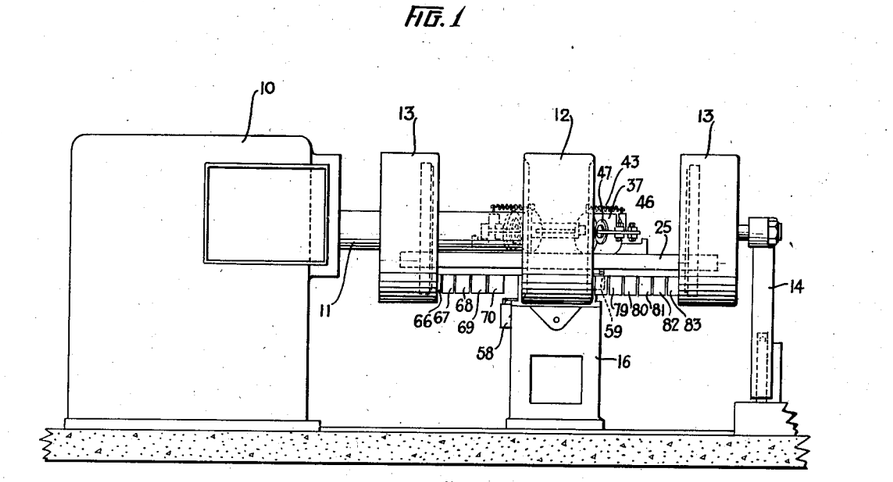
Figure 1 is a front elevation of apparatus embodying the invention, and a rotatable tire building drum upon which tires are built.

Referring now to Figure 1 of the drawings, there is shown a tire building machine comprising a housing 10 from which projects a horizontal rotatable spindle 11 upon the free end of which a collapsible tire building form or drum 12 is mounted, there being suitable driving means (not shown) located within the housing 10 for rotating said spindle and the drum 12 thereon. The drum 12 is of the type used in the manufacture of large heavy duty pneumatic tires such as require at least two inextensible bead cores in each bead thereof, said drum having oblique, undercut side faces for the reception of the bead cores during the fabrication of a tire. Plies of tire building fabric are drawn onto the drum, by the rotation thereof, from conveniently positioned stock rolls (not shown), said tire plies being of considerably greater width than the drum to enable the lateral marginal portions of the plies to be folded inwardly onto the undercut lateral faces of the drum. To facilitate the mounting of the fabric plies on the drum, circular supports 13, 13 are positionable in abutting relation to opposite sides of the drum, coaxially therewith, said supports carrying the marginal portions of the fabric plies until the medial portions of the plies have been rolled down onto the drum, said supports thereafter being moved to their inoperative positions, shown in Figure 1, in spaced relation to the drum. One of the supports 13 may be slidably mounted for axial movement upon the spindle 11, as shown. The other support 13 is swiveled on the upper end of an arm 14, the latter being movable relatively of the drum 12 to bring its support 13 into alignment therewith. The fabric plies on the drum 12 are stitched down thereupon by several stitching mechanisms of which but one is shown, that one being known as the "back stitcher" and constituting the subject matter of the present invention.

Figures 4, 5:
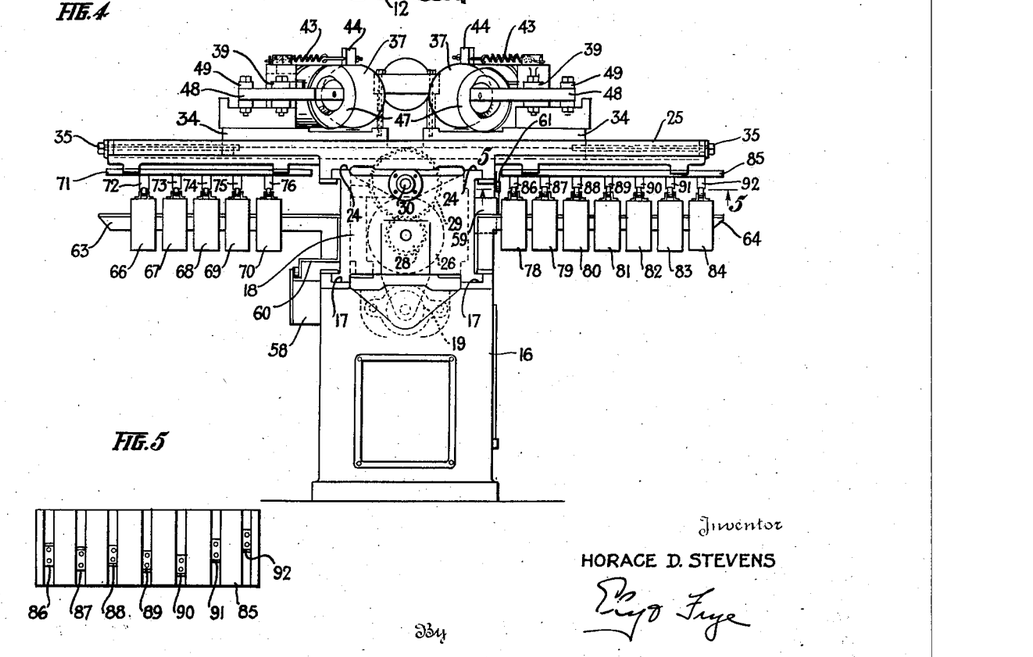
Figure 4 is a front elevation of the structure shown in Figure 2.
Figure 5 is a detail bottom plan view of a plurality of switch operating cams of the apparatus as viewed from the line 5—5 of Figure 4.

The back stitcher is utilized for working the marginal portions of the fabric plies onto the undercut side faces of the drum, and about the bead cores that may be mounted thereon for incorporation in the tire. Said back stitcher comprises a base structure or housing 16 that is located behind and below the drum 12, the central vertical plane of the base being coincident with the central vertical plane of the drum. The top of the base 16 is formed with parallel, longitudinally extending ways 17, 17, Figure 4, and slidably mounted upon said ways is a carriage 18, the arrangement enabling the carriage to move toward and away from the drum 12. Such movement of the carriage is effected by means of a double acting fluid pressure operated cylinder 19 that is located within the base 16 near the top thereof, said cylinder comprising a piston rod 20 that projects rearwardly therefrom and at its outer end is connected to a drive plate 21 that is mounted upon the rear face of the carriage 18 and projects below the same to connect with said piston rod.

The top of the carriage 18 is formed with parallel, longitudinally extending ways 24, 24, and slidably mounted upon said ways is a stitcher slide 25, the arrangement being such that the slide 25 is movable toward and away from the drum 12 relatively of the carriage 18 and base 16. For so moving the slide 25, a reversible electric motor 26 is mounted within the carriage 18, the shaft of said motor being coupled to a reduction gear device 27 also carried within said carriage. The driven shaft of the reduction gear device 27 carries a gear 28 that is meshed with a gear 29, the latter being mounted upon one end of a feed screw 30 that is journaled in the front and rear walls of the carriage 18 at the top thereof and in the central plane of the carriage. The feed screw 30 is threaded through a nut 31, Figure 2, that is secured to the bottom of the slide 25, the arrangement being such that operation of the motor 26 will move the slide 25 toward or away from the drum 12. Control means presently to be described is provided for the motor 26 whereby the operative proximity of the slide to the drum automatically may be altered for successive phases of a cycle of operation employed in the building of a tire on the drum.

Figure 2:
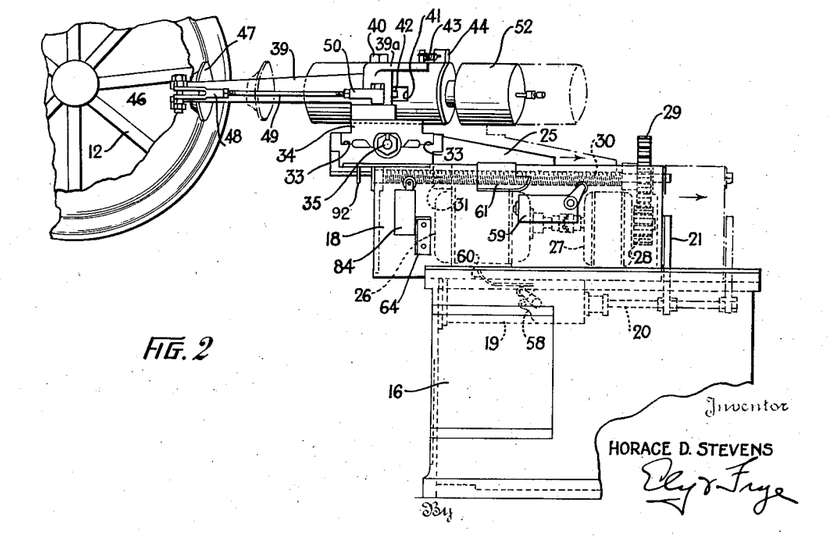
Figure 2 is a side elevation thereof, on a larger scale, in operation upon a tire being built upon said drum.

The top of the stitcher slide 25 is formed with ways 33, 33, Figure 2, that extend across said slide, transversely of the ways 24 and 17 of the carriage 18 and base 16 respectively. Slidably mounted upon the ways 33, 33 are two cylinder slides 34, 34 that are positioned on opposite sides of the central plane of the apparatus. Said cylinder slides are adjustable toward and away from the central plane of the apparatus, and to this end respective adjusting screws 35 extend through walls of the stitcher slide at the outer ends of the ways 33 and are threaded into the adjacent ends of the respective cylinder slides 34. The arrangement adapts the apparatus for use with tire building drums 12 of different widths.

Figure 3:
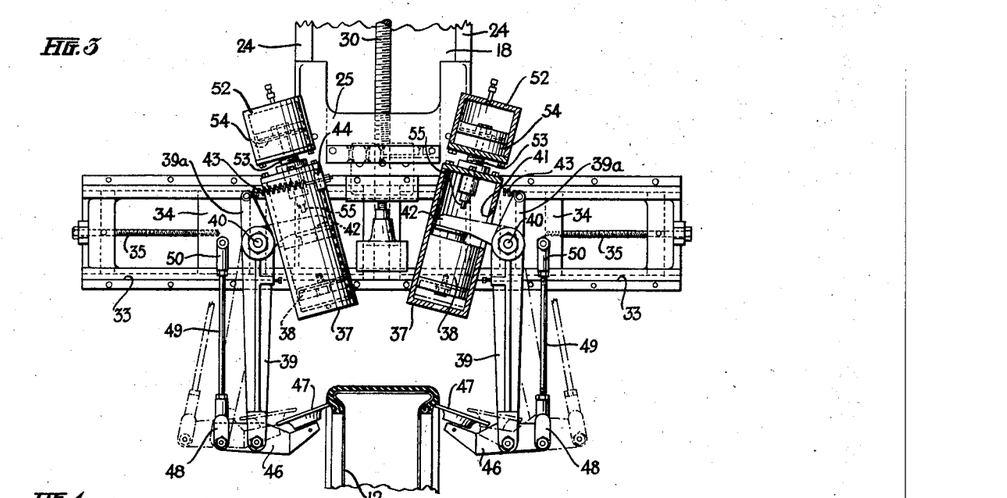
Figure 3 is a plan view of the apparatus, a part thereof being broken away and in section.

Mounted upon the cylinder slides 34 are respective single-acting fluid pressure operated cylinders 37, the axes of said cylinders being horizontally disposed, and arranged obliquely with relation to the central vertical plane of the apparatus. The horizontal plane of the axes of cylinders 37 is slightly below the axis of the drum 12, as shown in Figure 2, and said cylinder axes converge toward each other at the ends of the cylinders nearest the drum. The cylinders 37 are arranged to be charged at the ends thereof nearest the drum 12, and this end of each cylinder has a piston 38 mounted therein. The cylinders 37 are employed for moving respective stitching tools laterally into operative engagement with the work on the oblique lateral faces of the drum 12, and to this end respective stitcher arms 39 are pivotally mounted at 40 on the cylinder slides 34, at the sides of the respective cylinders 37 that are remote from each other. Each cylinder 37 is formed with a slot 41 Figure 3, therein rearwardly of its piston 38, and each stitcher arm is formed, at its pivot 40, with a laterally projecting finger 42 that extends through the slot 41 of the adjacent cylinder, the free end of said finger being engaged by the piston 38 of the cylinder. Each stitcher arm 39 has a rearward extension 39a beyond its pivot 40 and connected to the free end of said extension is one end of a tension spring 43, the latter extending across the top of the adjacent cylinder 37 and having its other end connected to an upwardly projecting lug 44 formed on said cylinder. The arrangement is such that the springs 43 normally hold the fingers 42 of the stitcher arms 39 against the rear ends of the respective pistons 38 at all times, thus urging the free forward ends of the stitcher arms away from the drum 12.

The forward end of each stitcher arm 39 carries a short lever 46 that is journaled at its middle therein on a vertical axis, the end of each lever 46 that is nearest the drum 12 having a rotatable stitching disc 47 swiveled thereon on a horizontal axis. Pivotally connected to the opposite end of each lever 46 is a clevis 48 connected by a rigid link 49 with a swivel 50 that is pivotally mounted upon the cylinder slide 34. The link 49 has threaded connection with the clevis 48 and swivel 50, the arrangement being such as to enable the lever 46 to be adjusted angularly with relation to the stitcher arm 39. The link 49 is parallel to the stitcher arm 39, and the distance between the pivotal connections at the ends of each is substantially equal so that the stitcher arm and link constitute a parallel motion device for moving the stitching tool 47 from and toward the drum 12, as indicated in full lines and in broken lines in Figure 3, while maintaining said tool in a determinate angular position.

The stitching tools 47 are moved radially with relation to the drum 12 by the cylinder 19 and motor 26 as hereinafter will be more fully explained, and are moved laterally toward the drum by the pistons 38 of cylinders 37. The cylinders 37 thus provide the pressure for stitching down the plies of tire fabric on the lateral faces of the drum. Some of the over-bead fabric plies of a tire require to be folded onto the inner circumferential surfaces of the tire, that is, onto the inner circumferences of the bead portions thereof, and this operation also is performed by the stitching tools 47. However, this operation initially produces numerous folds or wrinkles in the margins of the fabric, which folds and wrinkles require to be worked out by the tools 47 to produce an acceptable tire. Accordingly said tools must be moved laterally across the inner faces of the beads at a slower rate than they would move if impelled normally by the cylinders 37. To this end means is provided for halting the movement of the tools transversely of the inner circumference of the beads for a sufficient interval of time to enable the folds or wrinkles in the fabric to be smoothed out.

Figures 7, 8:
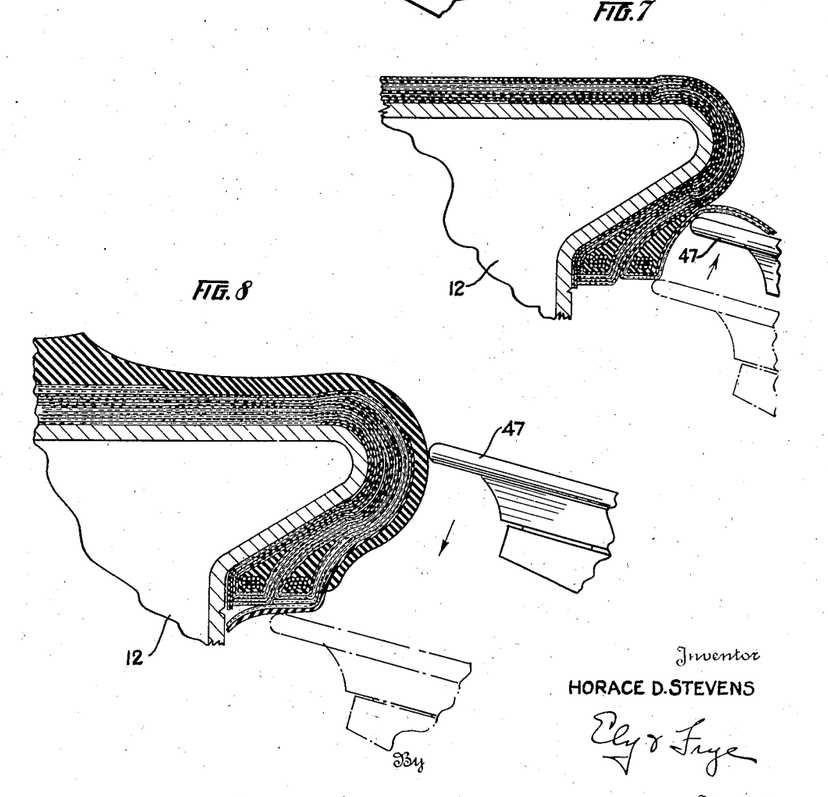

Said means comprises fluid pressure operated cylinders 52 acting in opposition to the respective cylinders 37. Each cylinder 52 is coaxially arranged with relation to its companion cylinder 37, at the rear of the latter, the cylinder head at the front end of each cylinder 52 being provided with an axially apertured, forwardly projecting formation 53 that is threaded through the rear cylinder head of the cylinder 37, thus to support the cylinder 52 upon the latter. The cylinders 52 are single acting and are arranged to be charged at their rear ends. Each cylinder 52 comprises a piston 54 having a piston rod 55 that extends through the axial aperture in the formation 53 and into the rear end of the cylinder 37 where it constitutes a stop for the finger 42 of stitcher arm 39 under certain conditions of operation. The cylinders 52 are utilized during the final stitching operation upon a tire to fold the outermost over-bead plies onto the inner circumference of the tire beads, as shown in Figure 8. When the apparatus starts to perform the operation shown in Figure 8, the cylinder 19 is charged to move the carriage 18 toward the drum 12 and cylinders 37 are charged to move the stitching tools 47 into engagement with the tire on the drum, the tools engaging the sides of the tire above the beads as shown in full lines in Figures 3 and 8. The cylinders 52 are charged concurrently with the charging of cylinders 37, with the result that piston rods 55 are projected into the rear ends of cylinders 37, as is clearly shown in Figure 3. The motor 26 then starts rotating in the direction that feeds the slide 25 toward the drum with the result that the tools 47 are fed toward the inner circumference of the tire being built on the drum, the cylinders 37 at the same time urging said tools laterally against said tire. As the tools 47 reach the inner circumference of the tire they move laterally across the beads of the tire, and it is at this time that the fingers 42 of the stitcher arm 39 encounter the piston rods 55 of the cylinders 52, with the result that the lateral movement of the stitching tools is halted. At this time the tools 47 are about half way across the tire beads, as is indicated by the broken line position of the tool 47 in Figure 8. While the tools 47 are in this position, the cylinder 19 is "bumped," that is, it is reversed so as to move the carriage 18 rearwardly and almost immediately again is reversed to move it forwardly to original position. Such movement of the carriage draws the tools 47 radially outwardly against the inner circumference of the tire beads and causes the tools to work out any folds or wrinkles in the fabric at the marginal regions thereof, the drum 12 making several revolutions during the "bumping" operation. Then the cylinders 52 automatically are exhausted enabling the pistons 38 of the cylinders 37 to swing the arms 39 laterally toward the drum and causing the tools 47 to complete their movement across the inner circumference of the tire beads to stitch the margins of the tire building material thereon. The operation of cylinders 37 and 19 and the motor 26 is then reversed to restore the apparatus to inoperative position.

Figure 6:
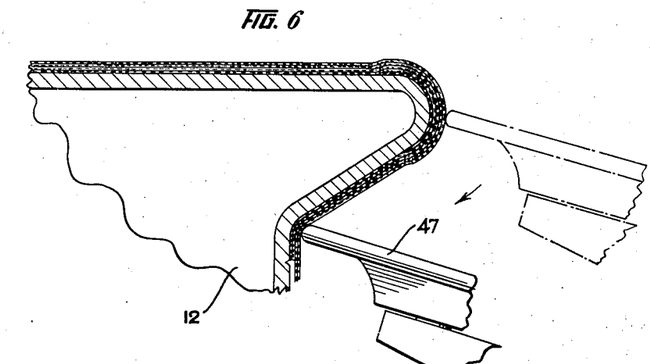
Figures 6, 7 and 8 are fragmentary sections of a tire building drum with work thereon, and a fabric stitching tool of the apparatus in operative association with the work in different stages of completion of the latter.

Referring now to Figures 6 to 8, a stitching tool 47 is shown in several of the positions it occupies during the building of a large size tire, specifically, a tire having 10 plies of tire building fabric. Said plies initially may be applied to the drum singly, but the tools 47 operate upon a plurality of the plies at a time. Thus in Figure 6 is shown the step of stitching down plies 1 to 4; in Figure 7 is shown the step of back-stitching plies 7 and 8 over the outermost of a pair of bead cores; and in Figure 8 is shown the step of stitching down plies 9 and 10 together with chafer strip and sidewall of the tire. The apparatus also performs intermediate operations (not shown) as will be understood by those skilled in the art, illustration thereof being omitted to avoid duplication. A comparison of Figures 6, 7, and 8 will show that the tools 47 operate upon the tire in a radially inward and in radially outward directions, and that points where the tools engage the tire and where they withdraw from the tire differ according to which operation they are performing on the tire.

For causing the tools 47 initially to engage the work at different determinate positions for the various operations, the motor 26 is employed to move the slide 25 relatively of the carriage 18, to "set up" the apparatus for the succeeding operation, such movement of the slide being effected immediately after the completion of each operation. The tools are caused to move radially of the tire a determined distance by suitable control means that in some operations stops and reverses the drive of the motor 26 after the tools have been moved radially of the tire the proper distance to achieve a particular stitching operation.

The circuit of the motor 26 comprises a limit switch 58 mounted upon one side of the base structure 16, and a limit switch 59 mounted upon the opposite side of the carriage 18. The operating lever of switch 58 extends into the path of a cam 60 carried upon the side of carriage 18, and the operating lever of limit switch 59 extends into the path of a cam 61 carried by the slide 25. The arrangement is such that when the rear end of cylinder 19 is charged to move the carriage 18 forwardly relatively of base structure 16, cam 60 operates switch 58 to effect the driving of motor 26 in the proper direction to perform the desired operation on the work. As soon as this operation is performed the motor in some cases, automatically reverses and retracts the slide 25, as presently will be described. In other cases the motor continues to move the slide rearwardly as the stitching operation is completed. When the slide 25 reaches its rearmost position, relatively of the carriage 18, the cam 61 operates switch 59 to reverse the drive of motor 26 to move the slide 25 forwardly a determinate distance to "set up" the apparatus for the succeeding operation.

Other switches in the motor-control circuit are carried by the carriage 18 and to operate the same the relative movement between said carriage and the slide 25 is utilized. To this end a supporting bracket 63 is mounted upon one side of the carriage 18 and projects laterally therefrom. A similar bracket 64 is similarly mounted on the other side of said carriage. Carried by the bracket 63 are five switches designated 66, 67, 68, 69, and 70 respectively, said switches having respective upwardly extending levers by means of which they are operated. For operating said switches a cam plate 71 is secured to the under side of slide 25, above said switches, and adjustably mounted on said cam plate are cams 72, 73, 74, 75, and 76 that are in fore-and-aft alignment with the operating levers of the respective switches 66 to 70. Switches 66 to 69 are stop switches for the setting up of the apparatus, and they stop the motor 26 after it has been energized by the switch 59 to move the slide 25 forwardly. By the proper positioning of the cams 72 to 75, the slide 25 is stopped at a plurality of different positions so that the tools 47 properly will engage the work at the beginning of the succeeding stitching operation. More specifically, switch 66 is a normally closed safety switch that limits the forward movement of the carriage 18 in case of over-run. It does not open during normal operation of the apparatus. Switch 67 is a stop switch that sets up the apparatus for operation upon the first four tire plies, which operation is shown in Figure 6, and upon the second four tire plies. Switch 68 is a stop switch that sets up the apparatus for stitching down the first tire bead, in which operation the tools 47 are moved radially outwardly of the drum 12. Switch 69 is a stop switch for setting up the apparatus for the turning up of the third and fourth fabric plies about the first tire bead, and for turning up the seventh and eighth fabric plies upon the second tire bead, the latter operation being shown in Figure 7, both operations requiring that the tools 47 move radially outwardly with relation to the drum 12. Switch 70 is a reversing switch to reverse motor 26 and thereby to enable the plies 5 and 6 to be turned under the first tire bead, after plies 7 and 8 have been turned up as shown in Figure 7. This switch is operated by the cam 76 while the slide 25 is moving rearwardly, relatively of carriage 18.

The cams 72 to 75 are arranged to operate the respective switches 66 to 69 only when moving over them during the forward movement of the slide 25. It will be obvious that when the slide 25 is moved forwardly to its maximum extent all the cams 72 to 75 will have operated their respective switches 66 to 69. However, operation of the apparatus requires that only one of said switches and the switch 70, be operated each time the slide is moved forwardly, and the sequence of operation does not require the switches to be operated in the succession shown. To this end control means is provided that automatically operatively connects the switches 67 to 70 with the motor circuit in determinate sequence to the end that each switch will function to stop the motor 26, or reverse the same, when operated by its companion cam only during the particular phase of operation for which the switch was designed.

Figure 9:
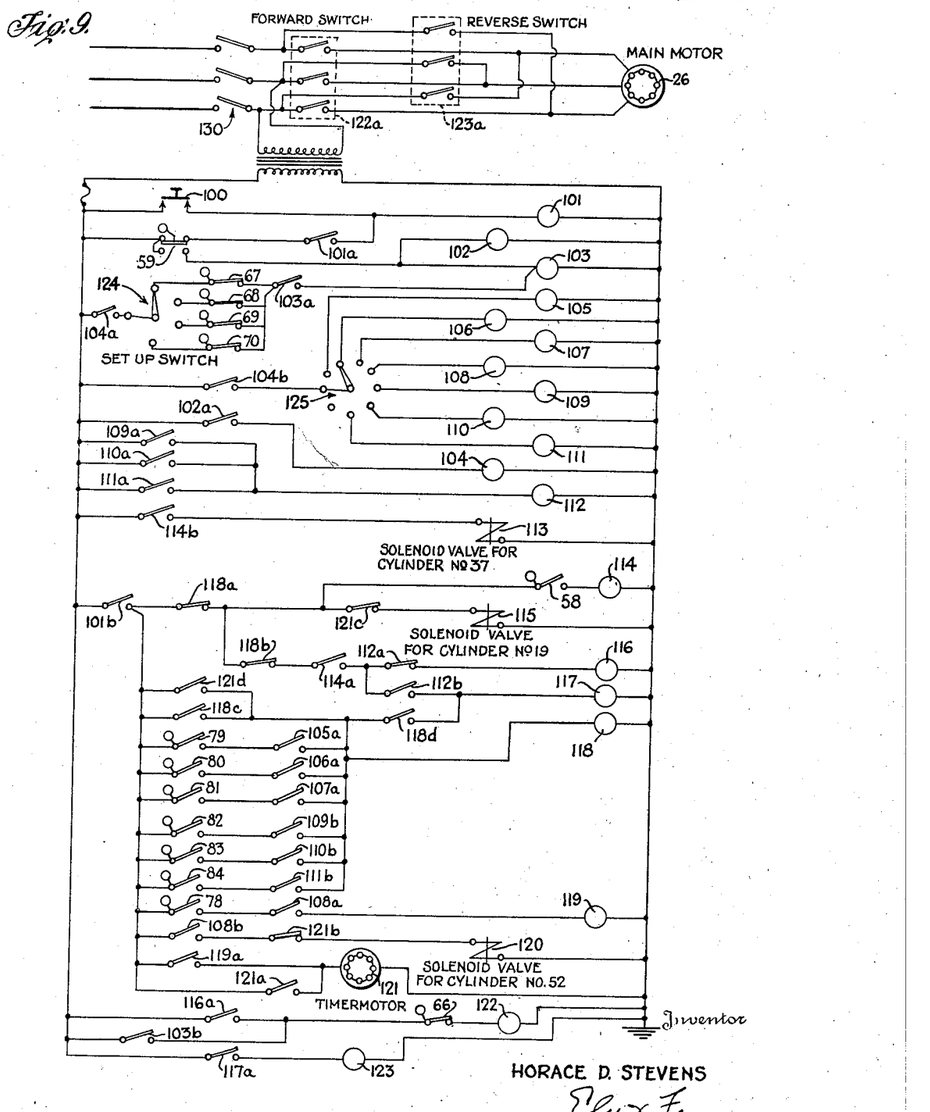
Figure 9 is the wiring diagram of the apparatus.

The arrangement of said control means will best be understood by reference to Fig. 9 of the drawings. Shown therein is a ratchet relay 102 that is energized by the actuation of limit switch 59 upon each return of the slide 25. Relay 102 controls the closing of a plurality of switches, of which only one switch 102a is shown, it being understood that said switches are operated in succession, a succeding switch being closed each time the relay is energized, and the previously closed switch being opened. Switch 102a, when closed, energizes relay 104, and operation of the latter closes normally open switches 104a and 104b. Closing of switch 104a energizes set up switch 124, it being noted that the closing of limit switch 59 also energized relay 103 and the latter has closed switches 103a and 103b. Set-up switch 124 is adjustable so that the circuit may be shifted to any of the limit switches in the set-up circuit, namely, switches 67, 68, 69 and 70. It will be understood that the other switches of ratchet relay 102, like 102a, control respective relays such as 104, and each of the latter controls the operation of a set-up switch (not shown) similar to set-up switch 124, all of the said set-up switches being connected in parallel with each other. The arrangement enables set-up limit switches 67, 68, 69 and 70 to be brought into operation in the desired sequence for the manufacture of tires of various ply arrangements.

The bracket 64 on the opposite side of the carriage 18 carries seven electrical switches designated 78, 79, 80, 81, 82, 83, and 84 respectively, of which switches 78 to 81 inclusive are in the motor control circuit, the operating levers of said switches extending upwardly. For operating said switches at the proper time during the building of a tire a cam plate 85 is secured to the under side of slide 25, said slide having adjustably mounted thereon a plurality of downwardly projecting cams 86, 87, 88, 89, 90, 91, and 92. Said cams are aligned with the operating levers of the respective switches 78 to 84, and operate the latter during the intervals that the tools 47 are engaged with the work. Thus it will be understood that switches 78 to 84 are so positioned that they operate after the time that respective switches 67 to 70 are operated.

The switches 78 to 81 function to stop the drive of the motor 26 in the direction that it is rotating and cause it to rotate in reverse direction. More specifically the switch 78 is a stop switch for the operation of switching down plies 9 and 10 under the outer beads, and for the "bump." Switch 79 is a stop switch for the operation of stitching down the first four fabric plies, as shown in Figure 6, the switch stopping and reversing the motor when the tools 47 are in the position shown in full lines in said figure. Switch 80 stops and reverses the motor at the completion of the operation of stitching down the second four plies of tire fabric. Switch 81 stops and reverses the motor as the margins of plies 5 and 6 are folded onto the inner circumference of the beads of the tire. Switch 82 is operated at the completion of the back-stitching of the first or inner tire bead. Switch 83 operates at the completion of the back-stitching of the third and fourth fabric plies onto the inner tire bead. Switch 84 operates at the completion of the back-stitching of the seventh and eighth fabric plies onto the second or outer bead, which operation is shown in Figure 7. The switches 78 to 84 are mounted in the circuit of the motor 26 in a manner similar to switches 67 to 70, there being other control means, shown in Fig. 9 that automatically and successively cut the switches 78 to 84 into the motor circuit in determinate sequence, so that during any phase of operation only a particular switch will function when engaged by its companion cam. Switches 78 to 81 are operated during the forward movement of the slide 25 and serve to reverse the motor 26 so that it will feed the slide rearwardly. The switches 82 to 84 are operated while the slide 25 is moving rearwardly, and do not stop or reverse the motor, but serve another purpose presently to be explained.
For cutting the switches 78 to 84 into the circuit selectively in desired sequence, a selector switch 125 is provided, the same being brought into operation by the closing of switch 104b aforementioned. Selector switch 125 is adjustable so that any one of seven relay circuits may be energized, said circuits including relays 105, 106, 107, 108, 109, 110 and 111. Each of said relays when energized serves to close one or more normally open switches, of which switch 105a is in series with switch 79, switch 106a is in series with switch 80, switch 107a is in series with switch 81, switch 109b is in series with switch 82, switch 110b is in series with switch 83, switch 111b is in series with switch 84, and switch 108a is in series with switch 78. Switches 79 to 84 together with the aforementioned switches in series therewith are in the circuit of a relay 118, the latter arranged to operate normally closed switches 118a, 118b, and normally open switches 118c, 118d. Switch 108a is in series with switch 78 in the circuit of a relay 119, the function of which presently will be explained. Switches 109a, 110a, and 111a are arranged in parallel in the circuit of a relay 112, which relay controls a normally closed switch 112a in the circuit of a relay 116, and a normally open switch 112b in the circuit of relay 117. All of said limit switches 78 to 84 have connection with one side of the main power line through switch 101b controlled by starter relay 101, the circuit of which includes a manually operable starter button 100. The holding circuit of relay 101 includes a switch 101a operated by said relay, and the limit switch 59.

The fluid pressure operated cylinders 19, 37, and 52 require to be operated at determinate intervals with relation to the operation of the motor 26, and in the present invention such operation of the cylinders is effected automatically by means of solenoid-operated valves 115, 113 and 120 respectively, which valves are operated by various switches in the electrical control of the apparatus. The valve 115 that operates cylinder 19 is electrically operated by the switches 78 to 84 to charge the front end of the cylinder and evacuate the rear end thereof for the purpose of moving the carriage 18 rearwardly at the conclusion of each stitching operation. This valve control also includes the switch 101b closed by the manually operated switch 10 by means of which the rear end of the cylinder is charged to move the carriage 18 forwardly at the beginning of each operation. The cylinders 37 are concurrently charged by means of a solenoid valve 113 that is operated by the switch 58, closing of the latter energizing relay 114 which closes switch 114b in the circuit of solenoid valve 113, and also closes switch 114a in the circuit of relays 116, and 117. This valve 113 is reversed or discharged by the opening of switch 114b when the relay 114 is de-energized by the opening of switch 118a of relay 118 when the latter is energized by the closing of respective switches 79 to 84. The cylinders 52 are charged and discharged by means of a solenoid valve 120 that is controlled by a timing device comprising a timer motor 121 that operates normally open switches 121a, 121d, and normally closed switches 121b and 121c, the switch 121c being in series with switch 108b in the circuit of said solenoid valve 120. Said timing device is set in operation by the closing of limit switch 78 whereby relay 119 is energized to close switch 119a in the circuit of said timer motor 121. The latter has a holding circuit in which switch 121a is located. Switch 121c is in the circuit of the solenoid valve 115 and switch 121d is in the circuit of the relay 118.

The power circuit of the main motor 26 includes the usual manually operated master switch 130, an automatically operated switch 122a for so connecting the motor as to drive the slide 25 forwardly toward the work, and an automatically operated switch 123a for reversing the drive of the motor. Switch 122a is operated by relay 122, the circuit of which includes switches 103b and 116a arranged in parallel and the limit switch 66. Reverse switch 123a is operated by relay 123, the circuit of which includes the switch 117a of relay 117.

A typical cycle of operation is as follows: At the beginning of the operation of building a tire on the drum 12, the slide 25 is in a forward position relatively of the carriage 18, as shown in full lines in Figure 2, its position having been determined by operation of the "set-up" switch 67 at the conclusion of the preceding cycle of operation. The apparatus of the invention is employed after the first four plies of fabric have been mounted on the drum and folded over the rounded lateral margins thereof. To start the cycle of operation requires the operator merely to actuate the manually operable switch 100 that effects the charging of the rear end of cylinder 19, through the agency of solenoid valve 115 all subsequent operations being automatically effected. Charging of the rear end of cylinder 19 moves the carriage 18 forwardly toward the drum 12, from the broken line position of Figure 2 to the full line position therein, and at substantially the limit of such forward movement of the carriage the cam 60 operates switch 58. This results in the charging of cylinders 37 through the agency of solenoid valve 113, to move the stitching tools 47 laterally into engagement with the fabric plies on the sloping sides of the drum, and also starts the drive of the motor 26, by energizing relay 116 to close switch 116a in the circuit of relay 122 controlling motor switch 122a, to move the slide 25 toward the drum, relatively of the carriage 18. The operation of the tools 47 on the work is shown in Figure 6, the tools engaging the work at the position shown in broken lines, the movement of the slide 25 carrying the tools to the tool position shown in full lines. Forward position of the tools 47 is determined by the stop switch 79. When the latter is operated by the cam 87 on the forwardly moving slide 25, it first energizes relay 118 which opens switch 118a and thereby de-energizes relay 114, with resulting de-energization of solenoid valve 113 to effect discharge of cylinders 37 and thereby permits springs 43 to swing the tools 47 laterally away from the work. It also reverses the direction of drive of motor 26 by effecting the opening of switch 116a and the closing of switch 117a, so that the motor starts to move the slide 25 rearwardly relatively of carriage 18, and concurrently it operates to de-energize the solenoid valve 115 that controls the cylinder 19, to charge the front end of the latter while discharging the rear end thereof, whereby the carriage 18 is moved rearwardly relatively of the base 16, back to the position shown in broken lines in Figure 2. As the rearwardly moving slide 25 reaches its rearmost position relatively of the carriage 18, cam 61 on the slide engages and operates switch 59 to reverse the drive of motor 26, and the latter again feeds the slide 25 forwardly relatively of carriage 18. Such movement of the slide continues until stopped by the engagement of the cam 74 with the switch 68, the apparatus then being set up for the stitching down of tire beads that are next to be mounted upon the drum. This completes the cycle of operation for the application of the first four fabric plies to the drum.

The cycle of operation differs somewhat when the switching operation requires tools 47 to move outwardly with relation to the drum 12. Such a stitching operation is shown in Figure 7 wherein the seventh and eighth fabric plies are stitched onto the outside of the second or outermost tire beads, the stitching tools engaging the work first at the position shown in broken lines and progressing outwardly therefrom beyond the tool position shown in full lines in said figure. The apparatus is set up for this operation by the actuation of switch 69 at the conclusion of the prior operation. At the beginning of this operation, when the manually controlled starting switch 100 is actuated to charge the rear end of cylinder 19, the carriage 18 moves forwardly and operates switch 58 in the usual manner. This results in the charging of cylinders 37 to move the tools 47 against the work, and starts the drive of motor 26. The latter, however, by reason of the "set up," is caused to rotate in the direction that moves the slide 25 rearwardly and thus moves the tools 47 radially outwardly of the work, as shown in Figure 7. This condition obtains until cam 92 engages and actuates switch 84 with the result that cylinders 37 are discharged to move the tools 47 away from the work and the front end of cylinder 19 is charged to move the carriage 18 to its retracted position. Motor 26, however, continues its driving to move the slide 25 rearwardly, relatively of carriage 18, until cam 61 operates switch 59, with the result that the motor then reverses its drive and feeds the slide forwardly until stopped by the proper "set up" switch for the succeeding operation.

From the foregoing it will be apparent that the apparatus is substantially entirely automatic in its operation, and performs a plurality of different operations requiring different initial positioning of the stitching tools. It also enables the tools to be moved radially of the work while engaged therewith at a relatively slow speed, yet to be moved rapidly from and toward the work while out of engagement therewith. The presence of the cylinders 52 enables the tools 47 to stop and dwell at the determinate position upon the work, not withstanding the pressure of the cylinders 37 that urge the tools toward movement relatively of the work. The invention reduces the time required for the manufacture of pneumatic tire casings, and achieves the other objects set forth in the foregoing statement of objects.

Modification may be resorted to without departing from the spirit of the invention, or the scope thereof as defined by the appended claims.

What is claimed is:

1. In tire building apparatus, a stitching mechanism comprising a pair of stitching tools adapted to operate upon the bead portions of a tire structure on the undercut lateral faces of a rotatable annular form, fluid pressure operated means for moving said tools laterally with relation to the form into and out of engagement with said tire structure, electrically driven means for moving said tools radially with relation to the form while engaged with a tire on said form, a carriage supporting said stitching tools, fluid pressure operated means and electrically driven means, said carriage movable toward and away from the form, and means controlled by movement of the carriage toward the form for effecting concurrent actuation of said fluid pressure means and said electrically driven means.

2. In tire building apparatus, a stitching mechanism comprising a pair of stitching tools adapted to operate upon a tire structure on a rotatable annular form, fluid pressure operated means for moving said tools radially of the form to and from determinate positions at the sides of the form, fluid pressure operated means for urging said tools laterally against the work on the sides of the form, and electrically driven means for moving said tools radially of the form after being engaged with the work thereon.

3. In tire building apparatus, a stitching mechanism comprising a pair of stitching tools adapted to operate upon a tire structure on a rotatable annular form, fluid pressure operated means for moving said tools a determinate distance toward said form, means for temporarily interrupting said movement of the tools at a determinate position with relation to the form and intermediate the extremities of said movement, and means withdrawing said interrupting means automatically after a determinate time interval.

4. In a tire building apparatus, a stitching mechanism comprising a pair of stitching tools adapted to operate upon a tire structure on a rotatable annular form, fluid pressure operated means for moving said tools toward said form, means arranged in opposition to said fluid pressure operated means for temporarily impeding the movement of the tools under the impetus thereof, and timing apparatus for effecting withdrawal of said impeding means from impeding position after a determinate time interval.

5. A combination as defined in claim 4 wherein the impeding means comprises a fluid pressure operated cylinder.

6. In tire building apparatus, a stitching mechanism comprising a pair of stitching tools adapted to operate against a tire structure on a rotatable annular form, fluid pressure operated means for moving said tools laterally from and toward said form, a slide carrying said fluid pressure operated means, a carriage supporting said slide, a base structure supporting said carriage, means for moving said carriage relatively of the base structure toward and from said form to carry the tools to work-engaging position, and means for moving the slide relatively of the carriage in the same directions as the movements of the latter to move the tools operatively over the work on the form.

7. A combination as defined in claim 6 wherein the means for moving the carriage relatively of the base structure is a fluid pressure cylinder, and the means for moving the slide relatively of the carriage is a motor driven feed screw.

8. In tire building apparatus, a stitching mechanism comprising a stitching tool adapted to operate against a tire structure on a rotatable annular tire building form, a slide upon which said tool is mounted, a carriage supporting said slide, a base structure supporting said carriage, fluid pressure operated means for moving the carriage toward and from the said form and relatively of said base structure, an electric motor for moving said slide toward and from the said form and relatively of the carriage, and switch means in the motor circuit for causing the motor to position the slide at different inoperative positions relatively of the carriage after successive tire stitching operations.

9. A combination as defined in claim 8 wherein the switch means comprises a plurality of electrical switches mounted on the carriage and a plurality of cams on the slide adapted to operate respective switches by reason of relative movement between slide and carriage.

10. A combination as defined in claim 8 including switch means in the motor circuit for effecting the driving of the motor after the carriage has moved a determinate distance toward the tire building form.

11. In tire building apparatus, a stitching mechanism comprising a stitching tool adapted to operate against a tire structure on a rotatable annular tire building form, a slide upon which said tool is mounted, a carriage supporting said slide, a base structure supporting said carriage, means for moving the carriage from and toward said form and relatively of said base structure, a reversible electric motor for moving the slide from and toward said form relatively of said carriage, and a plurality of reversing switches in the motor circuit operated by relative movement between the carriage and slide for retracting the slide after the stitching tool has moved a determinate distance while engaged with the tire, said reversing switches operating at different relative positions of the slide in successive cycles of operation.

12. A combination as defined in claim 11 including a reversing switch in the motor circuit operated by relative movement between the slide and carriage for automatically again moving the slide toward the form after said slide has reached the limit of its rearward movement.

HORACE D. STEVENS.